(12) United States Patent
Takeuchi

(10) Patent No.: US 7,317,293 B2
(45) Date of Patent: Jan. 8, 2008

(54) DISPLACEMENT CONTROL SYSTEM FOR A VEHICLE AXLE

(75) Inventor: Kesatoshi Takeuchi, Suwa (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 10/531,244

(22) PCT Filed: Oct. 29, 2003

(86) PCT No.: PCT/JP03/13868

§ 371 (c)(1),
(2), (4) Date: Apr. 14, 2005

(87) PCT Pub. No.: WO2004/040746

PCT Pub. Date: May 13, 2004

(65) Prior Publication Data

US 2006/0103338 A1    May 18, 2006

(30) Foreign Application Priority Data

Oct. 29, 2002  (JP) .............................. 2002-314923

(51) Int. Cl.
*G05B 11/28* (2006.01)
(52) U.S. Cl. ...................... 318/599; 318/625; 318/608; 318/606; 318/607; 318/600
(58) Field of Classification Search ................ 318/599, 318/625, 608, 606, 607, 621, 600, 254, 138, 318/439; 388/811, 804, 911, 912, 812, 813; 363/71

See application file for complete search history.

(56) References Cited

U.S. PATENT DOCUMENTS

| | | | |
|---|---|---|---|
| 3,145,797 A | | 8/1964 | Taylor |
| 4,625,156 A | * | 11/1986 | Komiya et al. ................ 318/85 |
| 5,548,679 A | * | 8/1996 | Kiyota ........................ 388/811 |
| 6,433,496 B1 | * | 8/2002 | Kawagoshi .................. 318/254 |
| 2004/0179830 A1 | * | 9/2004 | Sunaga et al. .............. 388/804 |

FOREIGN PATENT DOCUMENTS

| | | |
|---|---|---|
| DE | 38 00 476 A | 7/1989 |
| EP | 1 037 052 A | 9/2000 |
| JP | 05-030602 A | 2/1993 |
| WO | WO89/06117 | 7/1989 |

OTHER PUBLICATIONS

Communication form Korean Patent Office regarding counterpart application, Oct. 19, 2006.

* cited by examiner

*Primary Examiner*—Karen Masih
(74) *Attorney, Agent, or Firm*—Harness, Dickey & Pierce, P.L.C.

(57) ABSTRACT

Provided is a motor control circuit in which the circuit structure is not complicated, which has a favorable response to the phase difference signal, and in which the signal variation caused by heat is small. This rotation control circuit of a motor includes: a PWM control circuit of the motor; a rotational speed sensor of the motor; a reference signal generation circuit 10; a phase comparing circuit; and a divider for dividing the detected rotational speed signal of the motor; wherein the phase difference between the signal from the divider and the signal based on the reference signal is sought with the phase comparing unit, and this phase difference signal is supplied to the PWM control circuit.

7 Claims, 7 Drawing Sheets

STOP (1)
FLOATATION PREPARATION (2)
FLOATATION COMPLETE (3)

FIG.8
[FLOW DURING INCLINATION]
STANDARD VEHICLE INCLINATION
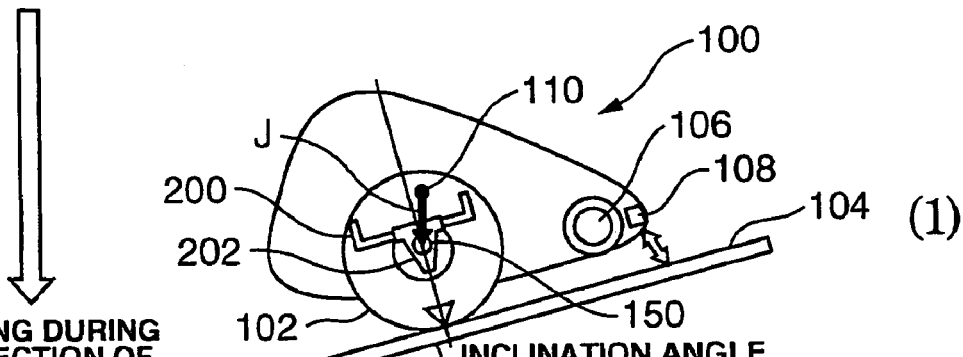
(1)
SETTING DURING CORRECTION OF UPWARD VEHICLE INCLINATION
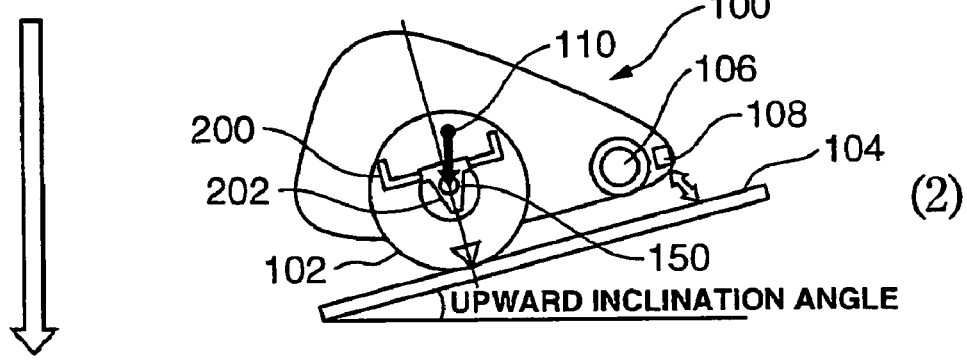
(2)
SETTING DURING CORRECTION OF DOWNWARD VEHICLE INCLINATION
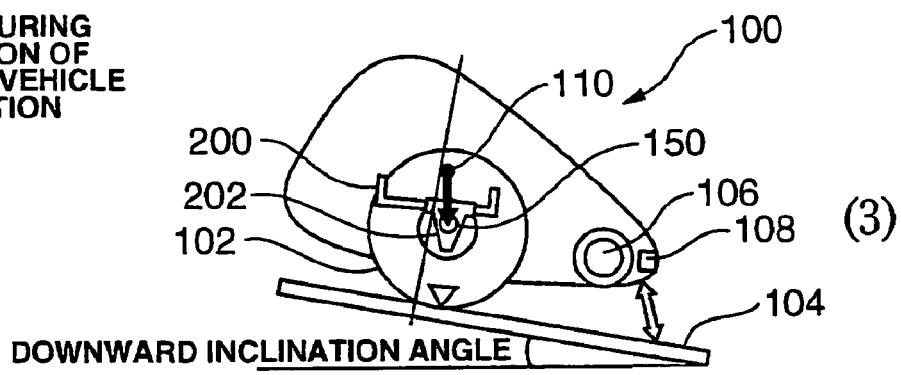
(3)

DISPLACEMENT CONTROL SYSTEM FOR A VEHICLE AXLE

CROSS-REFERENCE TO RELATED APPLICATIONS

This application is a U.S. National Stage (371) of International Application No. PCT/JP2003/013868 Oct. 29, 2003, and published in English as WO 2004/040746 A1 on May 13, 2004, which claims the benefit of Japanese Application No. 2002-314923, filed Oct. 29, 2002. The disclosures of the above applications are incorporated herein by reference.

1. Technical Field of the Invention

The present invention pertains to a PWM control circuit of a motor, and in particular to a rotation control circuit of a motor combining a PLL control circuit and a PWM control circuit. The present invention further relates to an invention employing this control circuit for controlling the drive motor for driving a driver.

2. Related Art

As this type of PWM control circuit, for example, there is a motor control circuit for an electric vehicle described in Japanese Patent Laid-Open Publication No. H5-30602.

This conventional technology has a motor circuit (CP1, TR1 to TR4) that generates a drive signal of a pulse width that changes in accordance with the acceleration voltage upon comparing the acceleration voltage and triangular wave, performs PWM control to the power transistor (TR1 to TR4) in accordance with said drive signal, and thereby energizes the motor M. Moreover, this conventional technology further comprises a current limitation circuit (Rs, CP2) for detecting the battery current supplied to the motor M and lowering the drive signal when such battery current exceeds a reference value, and a rotation number control circuit (2 to 4) for detecting the rotation number of the motor M and performing constant speed control to the motor M by changing the acceleration voltage based thereon.

Meanwhile, in order to accurately control the rotation number of the motor, a PLL circuit may be combined with this PWM control circuit. As with the control system shown in FIG. 1 enabling such a circuit, this system comprises a reference signal generation circuit 10, a circuit 12 for forming a triangular wave from this reference signal, a motor 14, a switching circuit 16 of the motor, an encoder 18 for detecting the rotation number of the motor, an N divider 20 for N dividing the detected pulse signal from the encoder, a phase comparing unit 22 for detecting the phase difference between the N divided signal and the reference pulse signal, a low pass filter 24, and a voltage comparator 25. This system forms an analog signal 26 from the low pass filter and a switch signal from the triangular wave and supplies these to the transistor gate of the switching circuit (PWM control circuit) of the motor.

In other words, the analog signal and the triangular signal are compared, and, during the period when the analog signal is higher than the triangular signal, a signal "H" is output to an amplifier 16A, and, during the period when the analog signal is lower than the triangular signal, a signal "L" is output to the amplifier 16A. Outputs from this amplifier are respectively input to the two transistor gates connected serially. Therefore, it is possible to change the duty ratio of the voltage supplied to the motor 14.

Nevertheless, with the circuit illustrated in FIG. 1, since the duty ratio control signal is obtained from an analog signal, the following problems arise in the analog circuit portion. Not only is the circuit structure complex, the response to the phase difference signal is inferior, and the signal variation caused by heat is significant.

SUMMARY OF THE INVENTION

An object of the present invention is to provide a rotation control circuit of a motor in which the circuit structure is not complicated, which has a favorable response to the phase difference signal, and in which the signal variation caused by heat is small.

Further, the inventors of the present invention examined the possibility of realizing a system for stably maintaining the position of a driver while it is driving by employing the control circuit of this motor. During this examination, the present inventors discovered that the posture of a driver while it is driving can be stably maintained by relatively moving the summation point of the drive unit in relation to the center of gravity of the driver main body. Further during this examination, the present inventors discovered that, as the control circuit for performing this kind of posture control, a system capable of detecting the position of the driver and utilizing this immediately; that is, a system enabling the posture control at a speed faster than the operational speed of a CPU is favorable. As this kind of system, it is preferable to apply the motor control circuit described above. In addition, a drive unit refers to the likes of a drive wheel for making the main body run. The summation point of the drive unit refers to a point where weight is applied to the main body, and, for instance, is an axle in relation to the drive wheel.

Thus, another object of the present invention is to provide a drive in which a motor as the drive source is rotation-controlled with this rotation control circuit, and a vehicle as an example of this type of driver.

In order to achieve the foregoing objects, the present invention is a rotation control circuit of a motor, comprising: a PWM control circuit of the motor; a rotational speed sensor of the motor; a reference signal generation circuit; a phase comparing circuit; and a divider for dividing the detected rotational speed signal of the motor; wherein the phase difference between the signal from the divider and the signal based on the reference signal is sought with the phase comparing unit, and this phase difference signal is supplied to the PWM control circuit.

According to this invention, since it is structured such that the phase difference signal is supplied to the PWM control circuit, provided is a rotation control system of a motor abbreviating an analog circuit, and the foregoing problems can be resolved thereby.

In one mode of the present invention, the rotation control circuit of a motor according to present invention further comprises a rotation command means of the motor; wherein the command means alters the division ratio of the divider in accordance with the contents of the rotational speed alteration request to the motor. Further, the present invention is also a driver comprising the rotation control circuit of a motor described above; wherein the driver employs the motor controlled with the control circuit as a drive source of a drive mechanism.

Further, the present invention is also a rotation control circuit of a motor, comprising: a PWM control circuit of the motor; a rotation command signal output means to the motor; a reference signal generation circuit; a phase comparing circuit; and a divider for dividing the command signal to the motor; wherein the phase difference between the signal from the divider and the signal based on the reference signal is sought with the phase comparing unit, and this phase difference signal is supplied to the PWM control circuit.

Moreover, the present invention is also a vehicle having a vehicle body, a drive wheel, an auxiliary wheel, and a first drive source and in which the first drive source rotates the drive wheel to make the vehicle run, comprising: a position sensor of the vehicle body; drive control means of the vehicle body; and posture control means of the vehicle body; wherein the posture control means has a second drive source for moving the position of the drive wheel in relation to the vehicle body in accordance with the signal from the position sensor and the drive control means, and a third drive source for making the auxiliary wheel float from the road surface.

According to this mode of the present invention, the position sensor outputs to the posture control means a frequency signal as a detection signal, and the posture control means determines the travel distance of the position of the drive wheel in relation to the vehicle body based on the phase difference between the reference signal and the frequency signal.

The posture control means has a reference signal generation circuit, a phase comparing circuit, a divider for dividing the pulse wave signal, and a PWM control circuit; wherein the phase difference between the signal from the divider and the signal based on the reference signal is compared with the phase comparing unit, this phase difference signal is supplied to the PWM control circuit, and the output of the PWM control circuit is supplied to the second drive source.

The first and second drive sources are electric motors. The position sensor is a distance sensor of the vehicle body and road surface, or an inclination sensor for detecting the inclination of the vehicle body.

In addition, the present invention is also a posture control system of a driver, comprising: a main body; a drive unit; a drive control unit for operating the drive unit and moving the main body; a position sensor of the main body; moving means for relatively moving the summation point of the drive unit in relation to the center of gravity of the main body; and determination means for determining the relative travel distance in accordance with the output value of the position sensor; wherein the summation point of the drive unit may be moved in the X-Y direction in relation to the center of gravity of the main body.

The determination means, preferably, as described above, obtains the foregoing relative travel distance by supplying the output value of the position sensor to the PLL control circuit. As a moving mechanism for relatively moving the drive unit in relation to the main body, an electric motor, a mechanical transmission means for transmitting the power of the electric motor to the mechanism for moving the drive unit, a linear guide or ball screw, for instance, as a moving mechanism of the drive unit may be used. As a result of supplying the output value of the position sensor to the PLL control circuit, and controlling the electric motor, the position of the drive unit can be determined immediately.

By supplying the output of the phase comparing unit of the PLL circuit directly to the PMW control circuit, and the PWM circuit altering the power supplied to the electric motor while altering the duty ratio, the rotation of the electric motor can be controlled.

As a result of relatively moving the summation point of the drive unit in relation to the center of gravity of the main body, the posture of the main body while it is driving can be stabilized, and the posture can be maintained steadily by compensating the disturbance against a stable posture control. When the driver is an electric car, an electric wheelchair or an electric cart, this kind of disturbance would be the positive or negative acceleration applied to the vehicle body, or the travel on a slope way.

When the drive posture of the driver can be stabilized, an auxiliary wheel or the like may be floated from the vehicle upon running the vehicle. As a result, the frictional force will decrease, the energy consumption of the driver will decrease, and the running efficiency of the vehicle and the drive efficiency of the driver can be improved.

Further, the X direction would be, for instance, the moving direction (forward/reverse directions) of the main body, and the Y direction would be, for example, the axial direction.

BRIEF DESCRIPTION OF THE DRAWINGS

FIG. 8 is a view showing a frame format for explaining the vehicle position control operation in a state where the vehicle is running on a slope way.

BEST MODE FOR CARRYING OUT THE INVENTION

Figure 1:
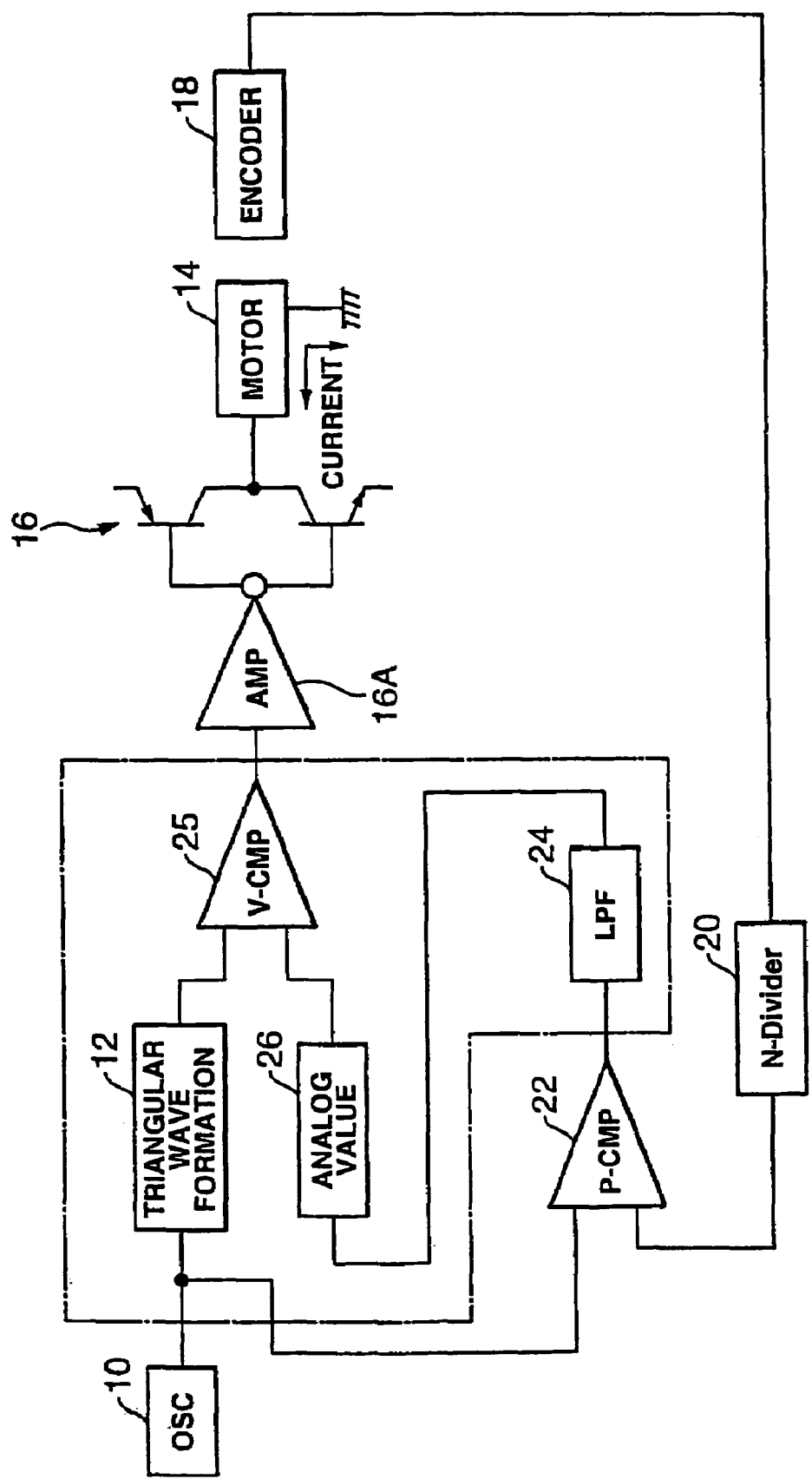
FIG. 1 is an example of a control circuit combining a PLL circuit and a PWM circuit for performing rotation control of a motor.
Figure 2:
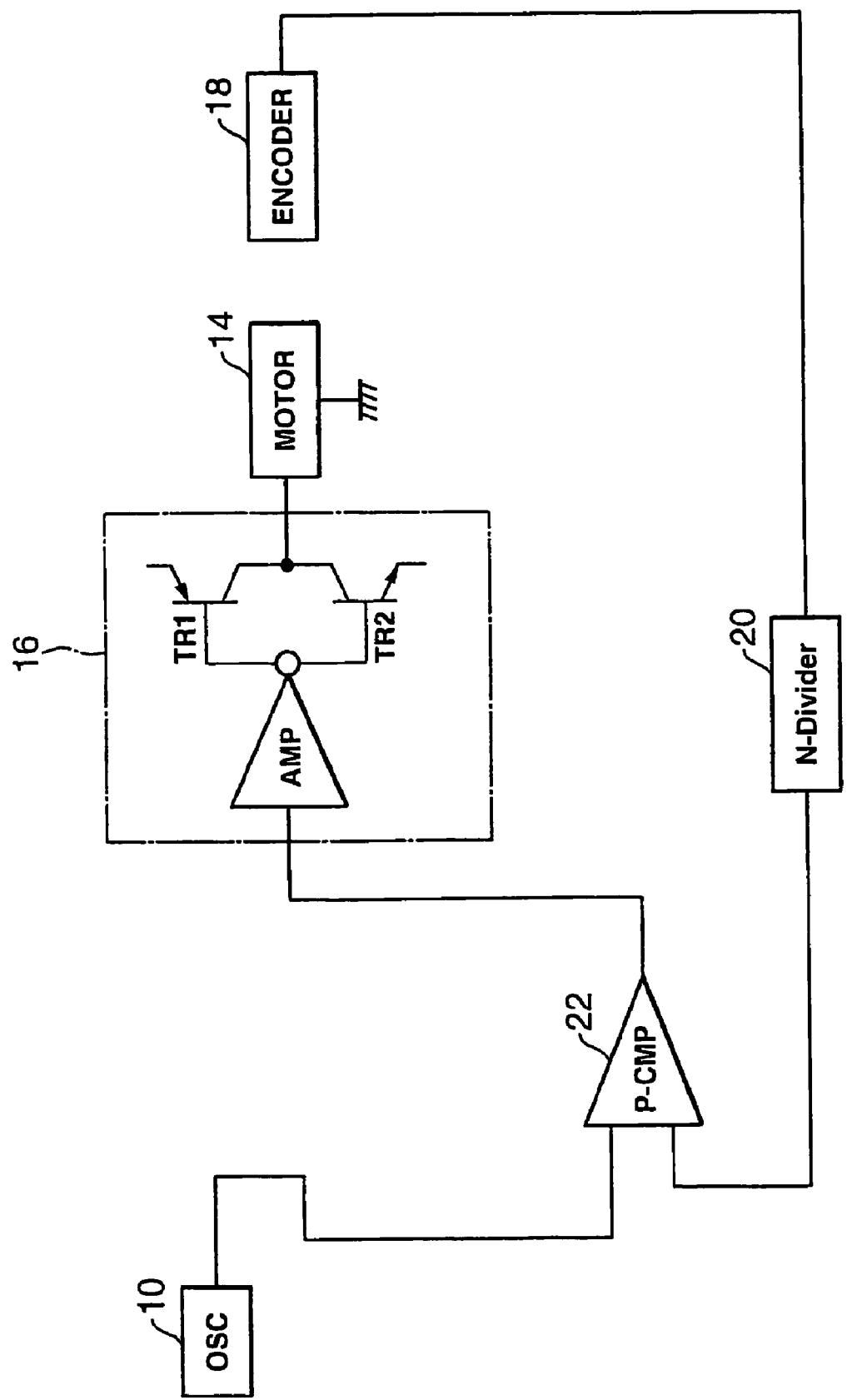
FIG. 2 is a block diagram of a control circuit of a motor combining a PLL circuit and a PWM circuit according to the present invention.

FIG. 2 depicts a rotation control motor pertaining to an embodiment of the present invention. The difference between this embodiment and the circuit shown in FIG. 1 is, foremost, that the reference pulse 10 as the first reference signal is input to the phase comparing unit 22, and the signal obtained as a result of comparing the phase difference between the signal from the N divider 20 and the reference signal is supplied directly to the PWM control circuit 16. Reference number 16 represents the PWM circuit for switching the motor. Further, the reference signal generation circuit 10, for instance, is structured from a reference frequency generation circuit and an M divider circuit for M dividing such reference frequency generation circuit.

Figure 5:
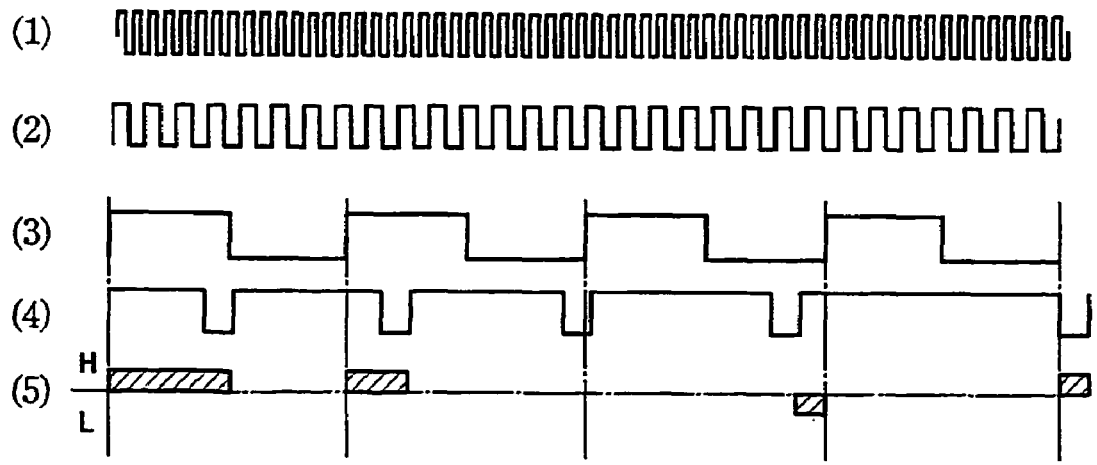
FIG. 5 is a waveform diagram for explaining the phase comparing operation in a phase comparing unit.

FIG. 5 is a waveform chart illustrating the phase comparing operation in the phase comparing unit 22. FIG. 5(1) is a basic frequency signal from a quartz oscillator. FIG. 5(2) is an output pulse waveform from an encoder 18. FIG. 5(3) is a waveform of the reference compared frequency signal obtained by M dividing the basic frequency signal. FIG. 5(4) is a waveform of the detected frequency signal obtained by N dividing the pulse signal from the encoder. FIG. 5(5) is a waveform of the phase difference signal based on the phase difference of two frequency signals output as a result of the phase comparison performed with the phase comparing unit 22.

In FIG. 2, for example, during the period when the phase difference signal is of an "L" impedance, TR1 is turned on, and, TR2 is turned off, and a normal rotation current flows to the motor. Meanwhile, during the period when the phase difference signal is of an "H" impedance, TR1 and TR2 are both turned off. Here, the motor 14 will rotate in reverse, or the motor may be used as a dynamic brake by connecting the motor to a load (storage unit).

According to this control circuit, since it is possible to realize a rotation control circuit of a motor without having to comprise an analog circuit, the foregoing problems can be resolved as a result thereof. Further, according to this circuit, when generating a difference in the rotation number of the motor, the motor can be duty-controlled in accordance with the phase difference.

This motor is an electric motor, and, for example, may be a DC motor, a brushless motor, a pulse motor, among others. As a result of employing this motor and the rotation control circuit of such a motor, a driver driven with this drive source can be provided broadly. As an example of this kind of drive, exemplified may be an electric car, an electric wheelchair, an electric cart, and so on.

Figure 3:
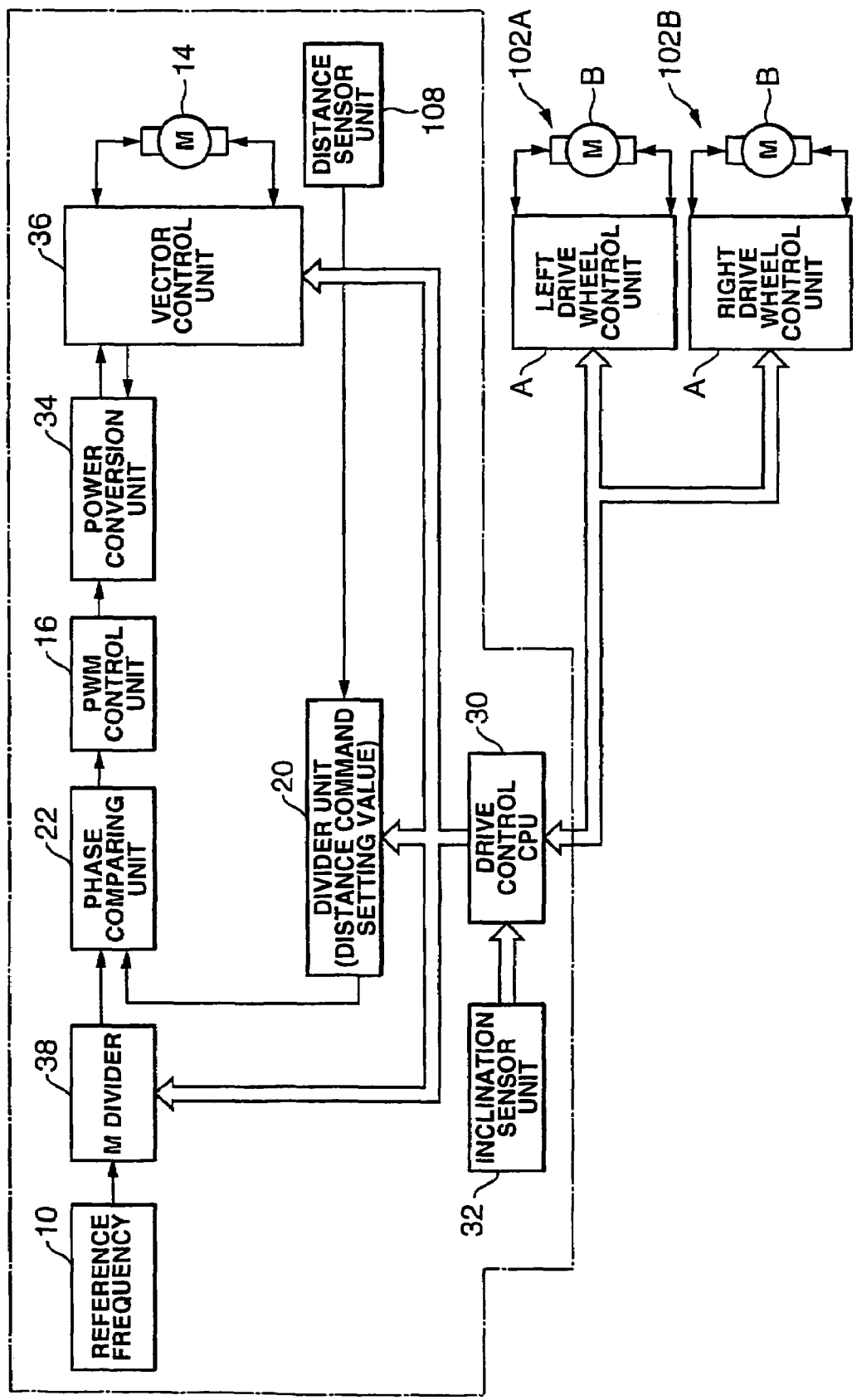
FIG. 3 is a block diagram of a vehicle position control circuit applying the present circuit in a vehicle position control mechanism.

FIG. 3 shows a control circuit in a case of applying the control circuit illustrated in FIG. 2 to the posture control of a vehicle. The posture control of a vehicle in the present embodiment implies the control for stably maintaining the posture of a vehicle for enabling a two-wheel drive. For example, as described above, this refers to the matching of the summation point of the drive wheel with the center of gravity of the vehicle body. This is now explained in further detail.

Prior to the explanation of the control circuit shown in FIG. 3, a vehicle 100 capable of a two-wheel drive is explained with reference to FIG. 4. This vehicle 100 has a pair of left and right drive wheels 102, and a similar pair of left and right auxiliary wheels 106 (or one auxiliary wheel 106 in the center).

The center point of gravity 110 of this vehicle is in front of the drive wheel 102, and the auxiliary wheel 106 of the vehicle is in contact with the road surface 104 in a state where the vehicle is parked. The drive wheel 102 is capable of rotating in the advancing direction of the vehicle, or in the reverse direction of the vehicle, and, as shown in FIG. 4(1) to (3), the vehicle is structured such the drive wheel 102 is moved to the center of gravity position of the vehicle body, and the auxiliary wheel 106 is thereafter floated from the road surface 104, and the vehicle is able to run with only the drive wheels 102. The auxiliary wheel 106 may be housed inside the vehicle body with an electromotive mechanism (third drive source) not shown (c.f. FIG. 4(3)).

Figure 4:
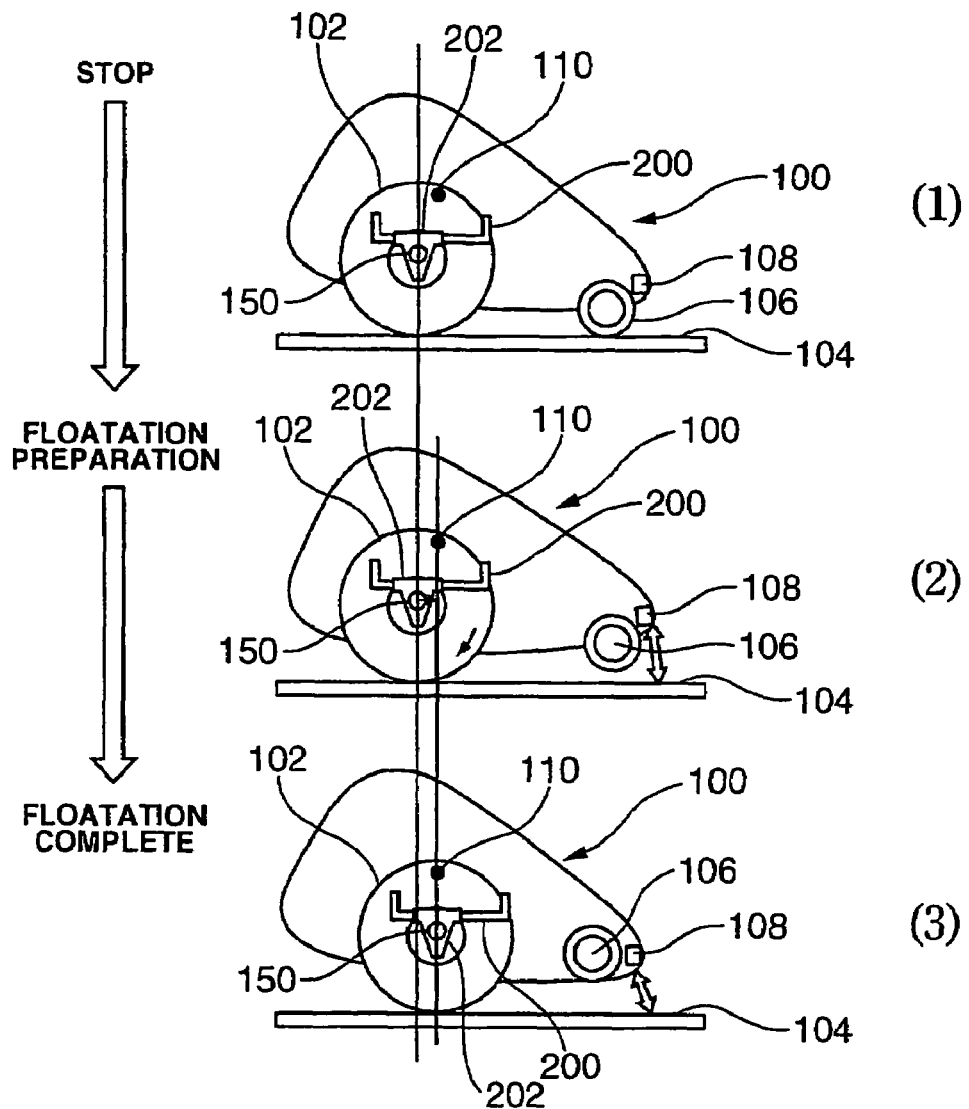
FIG. 4 is a view showing a frame format of the vehicle position control operation.

FIG. 4(2) shows a state where the drive wheel 102 has been moved relatively in the advancing direction of the vehicle 100, and the drive wheel 102 is moving toward the center of gravity position 110 of the vehicle. During this process, the auxiliary wheel 106 is floated from the road surface 104, and the vehicle may be supported with only the two left and right drive wheels 106.

Reference numeral 108 represents a distance sensor provided to the front end or back end of the vehicle. Further, the vehicle may comprise an inclination sensor instead of the distance sensor, or an inclination sensor together with the distance sensor. The detected values of these sensors are utilized in the posture control circuit illustrated in FIG. 3 for stably maintaining the posture of the moving vehicle.

To explain the circuit shown in FIG. 3, reference numeral 30 represents a drive control unit (command means to the respective drive sources) of the vehicle, and, in addition to controlling the driver A of the respective electric motors B of the left and right drive mechanisms 102A, 102B, it moves the position of the left and right drive wheels in relation to the vehicle body, and controls the vehicle posture control unit for enabling a two-wheel drive. The vehicle posture control unit is structured as follows.

Reference numeral 38 represents an M divider for M dividing the reference frequency signal 10, and reference numeral 34 represents a power conversion unit for amplifying the PMW control signal and obtaining the voltage signal to be supplied to the motor. Reference numeral 36 represents a vector control unit for altering the polarity of the voltage in accordance with the control from the drive control unit 30, and enables the control of the rotating direction of the motor.

As the distance sensor 108, any sensor is sufficient so as long as it is able to output a frequency signal in accordance with the distance with the road surface, and, for example, is structured from a mechanism for outputting an analog value (voltage value for example) in accordance with the distance with the road surface, and an element (voltage control generation circuit for example) for obtaining the frequency signal from this analog signal.

The phase between the N divided signal in which the frequency signal from the distance sensor is N divided with the divider unit 20, and the M divided signal in which the reference frequency signal is M divided with the M divider 38 are compared with the phase comparing unit 22.

The signal of an "H" impedance or "L" impedance after comparison is input to the PMW control unit, and the duty ratio of the pulse signal output from the PWM in accordance with the period of "H" impedance or "L" impedance is altered. This alteration of the duty ratio becomes a power difference in the power conversion unit, and is supplied to the motor 14.

This motor 14 is to become the drive source (second drive source) for moving the drive wheel 102 in relation to the vehicle body. When the drive wheel is moved toward the center point of gravity 110 of the vehicle, and the axle (summation point) of the drive wheel is made to match the perpendicular line from the center point of gravity 110, the vehicle body can be supported with only the drive wheels, and the vehicle is able to perform a two-wheel drive. Here, by floating the auxiliary wheel 108 from the road surface, the friction between the auxiliary wheel and road surface can be eliminated upon running the vehicle.

As described above, since the motor 14 (second drive source) for controlling the posture of the vehicle is driven under the PLL control in accordance with the output of the distance sensor 108, in comparison to the control under a CPU, there is an advantage in that the posture control can be conducted immediately and accurately.

The distance between the road surface sensor positioned at the forward bottom end of the vehicle body and the road surface will change in the following cases. First, when the auxiliary wheel is floating from the road surface and the vehicle body is supported with only the drive wheels. Second, in a state where the vehicle body is floating the auxiliary wheel and running with the drive wheels, and acceleration is applied to the vehicle body. Third, in a state where the vehicle body is floating the auxiliary wheel and running with the drive wheels, and the vehicle body is running on a slope way.

In the first case described above, the drive control unit 30 detects the initial movement of the vehicle body; for example, a state when the electric motor is turned on, suitably alters the M division ratio and M division ratio, and enables a greater phase difference in the phase comparing unit 22. As a result, a command for relatively moving the drive wheel 102 in relation to the vehicle body is supplied to the motor 14.

In the second and third cases described above, frequency of the pulse signal from the distance sensor will change depending on the acceleration or slope way. The drive control unit 30 controls the N division ratio and M division ratio in order to moved drive wheel in relation to the vehicle body to the side in which the distance between the distance sensor and the road surface is of a fixed value.

Without limitation to the foregoing distance sensor for moving the drive wheel 102 in relation to the vehicle body, an inclination sensor 32 for detecting the inclination of the vehicle body may also be used.

In FIG. 4, reference numeral 200 is a guide, and reference numeral 202 is a slider that moves back and forth along this guide. This slider is formed integrally with the drive wheel, and, by transmitting the rotation of the electric motor 14 to the slider or guide via a transmission mechanism not shown, the relative position of the drive wheel in relation to the vehicle body can be altered. For instance, the slider and guide may be structured as a moving mechanism of the drive wheel with a ball screw or a linear guide.

Next, the control mode is explained with reference to specific examples of the operation status of the vehicle body. First is the initial operation of the vehicle. When a passenger boards the vehicle and turns on the electric motor, the drive control unit 30 detects this ON signal, and, as shown in FIG. 4, moves the slider relatively along the guide. Here, since the drive wheel is in contact with the ground, the main body moves slightly in the reverse direction in relation to the drive wheel. As a result, the summation point of the drive wheel can be matched with the center of gravity position of the vehicle body.

In a state where the vehicle is immobile, the auxiliary wheel 106 is in contact with the ground, and the center point of gravity of the vehicle exists in front of the drive wheel. When the guide 202 is moved in relation to the vehicle body from a state where the vehicle is immobile, the drive wheel arrives immediately below the center point of gravity 110 of the vehicle, and the vehicle can thereby be supported with only the two drive wheels. The rotation distance of the drive wheel at such time may be considered as being substantially corresponding to the distance in which the drive wheel moved in relation to the vehicle.

Next, a case where the vehicle is accelerated is explained. When a positive acceleration is applied in the advancing direction of the vehicle, the front end of the vehicle tries to rotate in the counterclockwise direction around the axle of the drive wheel.

Figure 6:
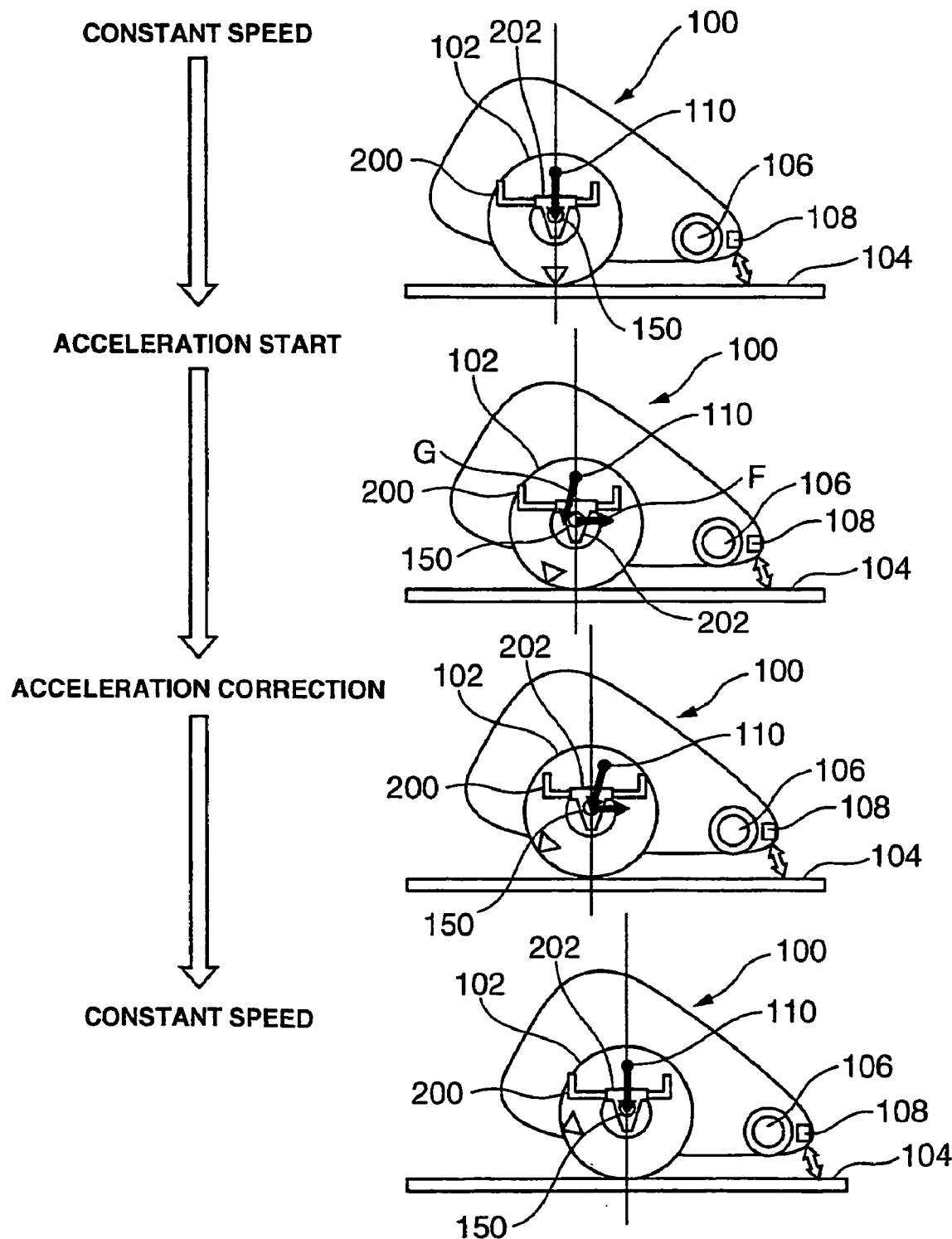
FIG. 6 is a view showing a frame format for explaining the vehicle position control operation in a state where the vehicle is accelerating.

In other words, as shown in FIG. 6, from a constant speed to the initial acceleration, acceleration F from the axle is generated, and a backward vector G is generated to the center point of gravity as a result of such acceleration F. As a result, the posture of the vehicle running on two wheels at a constant speed will collapse.

As a result of this rotation (collapse of vehicle posture), the distance between the vehicle body detected with the distance sensor 10 and the road surface will increase. The drive control unit 30 sets forth the N division ratio and M division ratio from the operational status of the vehicle, and makes a phase difference between the two signals appear in the phase comparing unit 22. For the N value and M value, for instance, suitable values in the relationship between the vehicle speed and vehicle acceleration are determined in advance, and are stored in the form of a memory table in the memory of the drive control unit.

When a phase difference occurs in the phase comparing unit 22, the duty ratio is determined with the PWM control unit 16 based on this phase difference signal, and the pulse signal dependent on this duty ratio is supplied to the power conversion unit 34. The power conversion unit 34 coverts the pulse signal into a power value to be applied to the motor 14. The drive control unit 30 determines the polarity of the voltage value, and commands this to the vector control unit 36.

When a positive acceleration is applied to the vehicle, as shown in the acceleration correction diagram of FIG. 6, when the drive wheel that is, the slider 202 is relatively moved in the reverse direction in relation to the vehicle body along the guide 200, the axle 150 and the center of gravity 110 will become misaligned, a vector for making the vehicle body rotate in the clockwise direction around the axle will be generated, and the collapse of the floating posture of the vehicle body can be corrected and compensated.

Next, during the period when the vehicle returns to the state of traveling at a constant speed, the position of the vehicle returns to the center point of gravity 110 based on the phase difference of the two signals generated with the phase comparing unit 22 with the output from the distance sensor 108.

Figure 7:
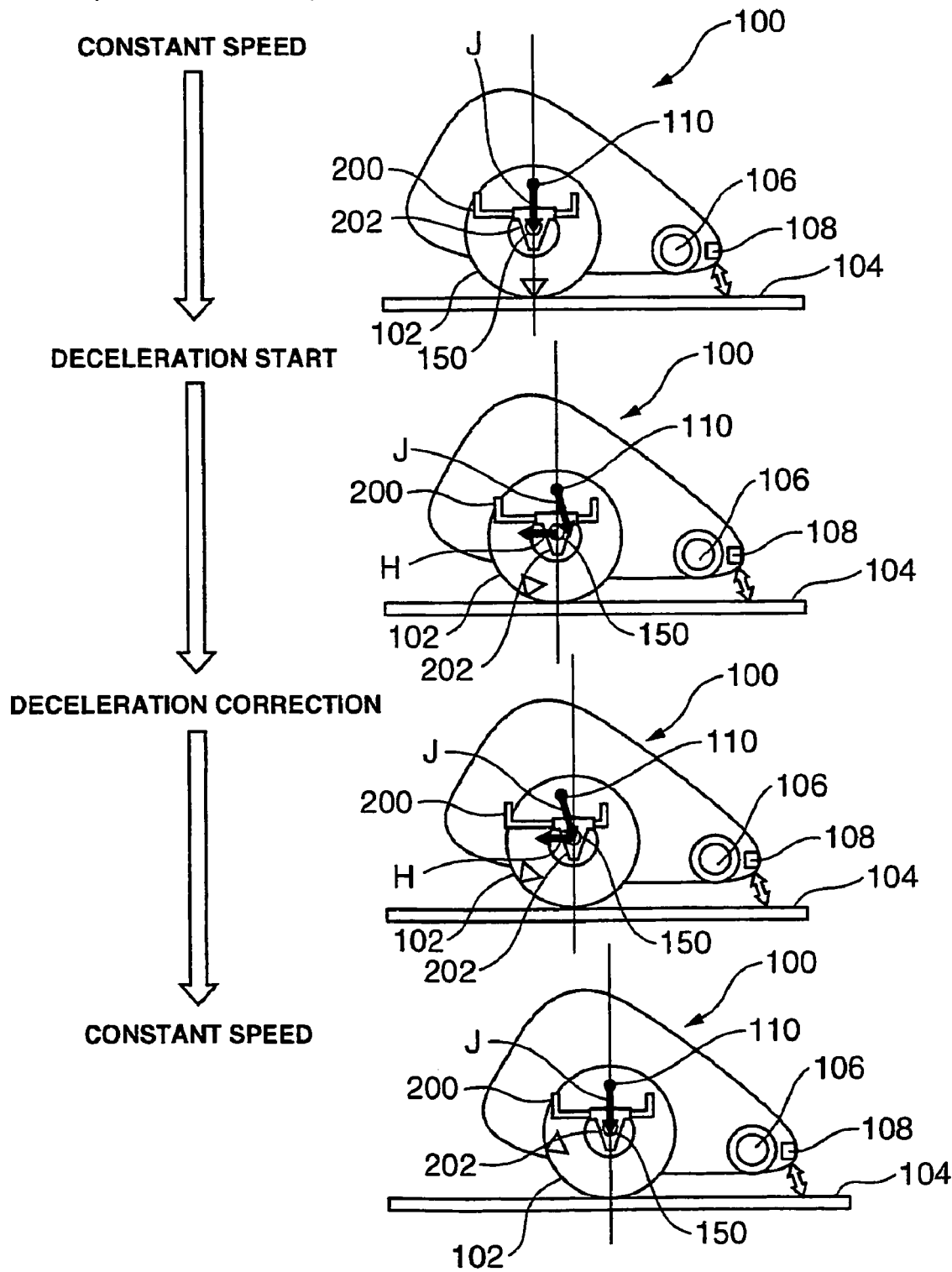
FIG. 7 is a view showing a frame format for explaining the vehicle position control operation in a state where the vehicle is decelerating.

Next, when acceleration in the deceleration direction of the vehicle is applied, opposite to FIG. 6, the vehicle tries to rotate in the clockwise direction around the axle. In other words, as illustrated in FIG. 7, when a deceleration vector is generated to the axle 150, a forward vector I is generated to the center point of gravity as a result of such deceleration vector, and the posture of the vehicle body around the axle 150 will collapse.

Here, the control circuit depicted in FIG. 3 will control the motor 14 such that the drive wheel 102 will move in relation to the advancing direction of the vehicle, and the axle 150 will be positioned in front of the center point of gravity. As a result, the center of gravity vector J is PLL controlled so as to converge (be directed toward) the axle in accordance with the variation of the distance sensor.

Next, when the vehicle stops, the vehicle will stand erect such that the vehicle body is supported with the two drive wheels 102 as described above, and, when the electric motor is turned off, while exposing the auxiliary wheel 106 from the front part of the vehicle, the drive wheel is rotated slightly in the reverse direction of the vehicle while moving the drive wheel in the reverse direction of the vehicle, and the parking of the vehicle is completed by the vehicle being supported by the auxiliary wheel 106.

Next, a case where the vehicle is running on a slope way is explained. When the vehicle approaches an upward inclination from a state of traveling at a constant speed, in order to stabilize the vehicle posture while running on a slope way, in comparison to the ordinary distance when the vehicle is traveling on a level road, the distance between the distance sensor and the road surface is made to become smaller when it is an upward inclination and made to become larger when it is a downward inclination. FIG. 8(1) shows a case where the distance between the distance sensor and the road surface is of a normal distance, FIG. 8(2) shows a case where the distance between the distance sensor and the road surface is smaller than the normal distance, and FIG. 8(3) shows a case where the distance between the distance sensor and the road surface is larger than the normal distance.

The distance between the distance sensor and the road surface is stored in the form of a memory table in the memory for each positive or negative inclination angle. The inclination angle may be detected with an inclination sensor. The posture control circuit moves the drive wheel in the forward or backward direction in relation to the vehicle body such that the distance between the distance sensor and the road surface becomes a set value in the slope way.

In both FIGS. 8(2) and (3), the position of the drive wheel is controlled such that the center of gravity vector J applied to the center point of gravity is converged to the axle. The posture control of the vehicle may be made in the forward or backward direction, or in the left or right direction. Although the foregoing embodiments exemplified a case of two wheels (two axes), the present invention is not limited thereto, and may also be applied to a case of one wheel (one axis).

The invention claimed is:

1. A rotation control circuit of a motor, comprising:
   a PWM control circuit of the motor;
   a rotational speed sensor of the motor;
   a reference signal generation circuit;
   a phase comparing circuit;
   a divider for dividing the detected rotational speed signal of the motor; and
   rotation command means of the motor;
   wherein the phase difference between the signal from the divider and the signal based on the reference signal is sought with the phase comparing unit, and this phase difference signal is supplied to the PWM control circuit; and
   wherein the command means alters the division ratio of the divider in accordance with the contents of the rotational speed alteration request to the motor.

2. A driver comprising the rotation control circuit of a motor according to claim 1, wherein the driver employs the motor controlled with the control circuit as a drive source of a drive mechanism.

3. A driver comprising the rotation control circuit of a motor according to claim 1, wherein the driver employs the motor controlled with the control circuit as a drive source of a drive mechanism.

4. A vehicle having a vehicle body, a drive wheel, an auxiliary wheel, and a first drive source and in which the first drive source rotates the drive wheel to make the vehicle run, comprising:
   a position sensor of the vehicle body which outputs a frequency signal as a detection signal;
   drive control means of the vehicle body; and
   posture control means of the vehicle body which has a second drive source for moving the position of the drive wheel in relation to the vehicle body, a third drive source for making the auxiliary wheel float from the road surface, and a control circuit for controlling the second drive source in accordance with the frequency signal from the position sensor and the drive control means;
   wherein the control circuit has a reference signal generation circuit, a phase comparing circuit, a divider for dividing the frequency signal, and a PWM control circuit, the phase difference between the signal from the divider and the signal based on the reference signal is compared with said phase comparing unit, this phase difference signal is supplied to the PWM control circuit, and the output of the PWM control circuit is supplied to the second drive source.

5. A vehicle according to claim 4, wherein the first and second drive sources are electric motors.

6. A vehicle according to claim 4, wherein the position sensor is a distance sensor of the vehicle body and road surface, or an inclination sensor for detecting the inclination of the vehicle body.

7. A vehicle according to claim 4, wherein the detection signal is a distance signal for indicating the distance of the vehicle body and road surface, or an inclination signal for indicating the inclination of the vehicle body.

* * * * *

UNITED STATES PATENT AND TRADEMARK OFFICE
CERTIFICATE OF CORRECTION

PATENT NO. : 7,317,293 B2
APPLICATION NO. : 10/531244
DATED : January 8, 2008
INVENTOR(S) : Kesatoshi Takeuchi It is certified that error appears in the above-identified patent and that said Letters Patent is hereby corrected as shown below:

Col. 1, line 32: "(Rs," should be -- ($R_s$, --

Col. 2, line 52: after "to" insert -- the --

Col. 3, line 58: "PMW" should be -- PWM --

Col. 5, line 44: after "such" insert -- that --

Col. 6, line 10: "PMW" should be -- PWM --

Col. 6, line 30: "PMW" should be -- PWM --

Col. 6, line 67: "M" should be -- N --

Col. 7, line 9: "moved" should be -- move the --

Col. 8, line 14: after "wheel" insert -- 102; --

Col. 9, line 24: before "rotation" insert -- a --

Col. 9, lines 37-40: delete claim 3. (claims 2 & 3 are identical).

Signed and Sealed this

Twenty-first Day of October, 2008

JON W. DUDAS
*Director of the United States Patent and Trademark Office*